United States Patent Office 2,888,381
Patented May 26, 1959

2,888,381

SOLUTIONS OF CITRUS BIOFLAVONOIDS

Louis Freedman, Mount Vernon, A. Jay Merritt, New Rochelle, and Sidney A. Sadin, Yonkers, N.Y., assignors to U.S. Vitamin Corporation, New York, N.Y., a corporation of Delaware No Drawing. Application September 1, 1955
Serial No. 538,291

8 Claims. (Cl. 167—81)

(Filed under rule 47(a) and 35 U.S.C. 116)

This invention relates to novel compositions of matter comprising stable, and edible, or injectable solutions of citrus bio-flavonoid compounds.

Concentrates of these bio-flavonoid compounds obtained from citrus pulp and peels, or the molasses derived from the residue of citrus pulp and peels, are obtained commercially as an amorphous yellow to brown powder, about 90% soluble in water, and consisting of at least 60% or more of polyphenolic compounds of flavonoid structure. The composition of the flavonoid complex is believed to consist of a mixture of several known flavones or flavanones together with a possible unknown substance or substances of flavonoid structure, individually, having varying degrees of biological activity, and the complex is known to have therapeutic or medicinal activity in reducing capillary fragility; and it will be hereinafter referred to as citrus bio-flavonoid complex. The complex, in powdered form and capsulated, has been sold in the United States by the U.S. Vitamin Corporation (assignee of the present application) since prior to 1950, with ascorbic acid added, under the trade name "C.V.P."; and the label thereof, bearing the caption "Citrus Bio-flavonoid Compound," is approved by the Food and Drug Administration. The complex is also described in the paper delivered (inter alia) by applicants Freedman and Merritt before the Dallas Meeting of the American Chemical Society in 1956; the complex being therein referred to by the initials "C.F.C." (short for Citrus Flavonoid Complex).

Since for oral use the therapeutic value of the bio-flavonoids largely depends on their being made soluble or dispersible for better absorption through the gastro-intestinal tract, and since in solutions used for intramuscular injection stability and lack of toxicity are commercially necessary, we have developed solutions which are stable and non-toxic; and which for oral administration also preferably contain a substance or substances giving a syrup-like body consistency and appealing flavor characteristics.

Though most of the citrus flavonoid compounds as they occur in nature in combination with sugars such as glucose or rhamnose, or in the form of organic complexes, have a fair degree of stability in water, we have found that water solutions of the concentrates of the citrus bio-flavonoid complex in percentages suitable for therapeutic use are relatively unstable and that precipitation occurs in time, rendering such solutions useless for sale as injectable products, and commercially unsuitable for sale as products for oral administration. Such unwanted precipitation is apparently due to a dissociation or hydrolysis of the flavonoid glycoside structure, resulting in reduced solubility and reduced therapeutic activity of the compound. We have found that this reduction in activity is more noticeable in the presence of alkalies even though such addition appears initially to increase the solubility.

We have discovered that the citrus bio-flavonoid complex is readily and completely soluble in propylene glycol and that even though diluted by up to half again as much water the solution remains clear and stable, with no significant evidence of either precipitation or reduction in therapeutic activity on standing. The addition of water is of particular advantage because it enables us to use less propylene glycol in making up a solution and still obtain a satisfactory product, and it also permits an adjustment of the solution to give desired limpidity for administration.

A product suitable for administration by injection may be prepared as shown in Example I, it being understood that this and other examples given therein are for illustration purposes and that modifications may be made within the skill of the art without departing from the invention disclosed and claimed herein. It may also be noted that the amounts are given in round numbers and to produce solutions having a final volume of about 1000 ml.

*Example I*

|  | Grams |
|---|---|
| (1) Citrus bio-flavonoid complex | 100 |
| (2) Propylene glycol | 800 } q.s. 1000 ml. |
| (3) Water | 200 |

*Procedure.*—Ingredient (1) is added to 800 ml. of a mixture of (2) and (3) made up of 800 grams of (2) and 200 grams of (3), (80% wt./wt. of propylene glycol in water), and the mixture stirred at room temperature until ingredient (1) is completely dissolved. The pH of the solution is adjusted to 6.0 by addition of concentrated sodium hydroxide and to the solution is added an additional volume of the 80% mixture of (2) and (3) to make one liter. The solution is then filtered through a suitable filter candle into sterile flasks and filled aseptically into ampules or vials. 1. ml. of this solution represents 100 mgms. of the citrus bio-flavonoid complex. The citrus bio-flavonoid complex may be dissolved directly in the propylene glycol by stirring and then brought to the same final composition by addition of water, and neutralized as described above.

The propylene glycol used can be the normal commercial grade of refined material, the water being the type normally used for preparing parenteral solutions. Preservative agents or bacteriostatic agents such as benzyl alcohol or chlorbutanol may be added but because of the high specific gravity of the product, may not be necessary.

While the proportion of water to propylene glycol is fairly critical, we have found that variations in the water content, up to 25%, may be made without affecting the stability of the solution with respect to the solubility of the citrus bio-flavonoid complex.

In making products for oral administration, we have found that the solutions of citrus bio-flavonoid complex can be improved from the standpoints of body consistency and flavor or palatability by incorporating additional substances such as sucrose or other sugar-like soluble material, saccharine, sorbitol, glycerine, and other suitable flavoring or sweetening agents. The following Examples II–VII are illustrative of such compositions that we have found suitable for oral administration, and of the preferred procedures of compounding same:

*Example II*

|  | Grams |
|---|---|
| (1) Citrus bio-flavonoid complex | 20 |
| (2) Propylene glycol | 466 |
| (3) Sorbitol | 458 |
| (4) Saccharine | 5 |
| (5) Water | 221 |

*Procedure.*—(A) Dissolve (1) by slow addition to (2) with stirring. (B) Dissolve (3) and (4) in (5). (C) Add (B) to (A) and stir until homogeneous.

Example III

| | Grams |
|---|---|
| (1) Citrus bio-flavonoid complex | 20 |
| (2) Propylene glycol | 466 |
| (3) Glycerine | 458 |
| (4) Saccharine | 5 |
| (5) Water | 221 |

The same procedure as for Example II is used in this example.

The formulae prepared under Examples II and III comprise approximately 1 liter each and are suitable for administering in teaspoon doses of 5 cc., each such 5 cc. containing 100 mgms. of the citrus bio-flavonoid complex.

In the above Examples II and III, and in the examples to follow, the amounts of water may be varied between 15% and 35% weight/weight with corresponding adjustment of the weights of sorbitol or glycerine. At greater than 35% water concentration, certain of the citrus flavonoids tend to precipitate.

Ascorbic acid functions conjointly with the citrus bio-flavonoids contained in the citrus bio-flavonoid complex in its effect on capillary fragility. It may also act as a sparing factor, less of the active bio-flavonoid complex being required. The addition of ascorbic acid is thus of advantage in the therapeutic use of the citrus bio-flavonoid complex.

The following Examples IV and V are representative of formulae combining ascorbic acid in association with the citrus bio-flavonoid complex as stable therapeutic compositions in aqueous solution.

Example IV

| | Grams |
|---|---|
| (1) Citrus bio-flavonoid complex | 20 |
| (2) Propylene glycol | 466 |
| (3) Ascorbic acid | 22 |
| (4) Sorbitol | 458 |
| (5) Saccharine | 5 |
| (6) Water | 221 |

*Procedure.*—(A) Dissolve (1) by slow addition to (2) under stirring. (B) Dissolve (3), (4), (5) in (6). (C) Add (B) to (A) and stir until homogeneous.

Example V

| | Grams |
|---|---|
| (1) Citrus bio-flavonoid complex | 20 |
| (2) Propylene glycol | 466 |
| (3) Ascorbic acid | 22 |
| (4) Glycerin | 458 |
| (5) Saccharine | 5 |
| (6) Water | 221 |

The same procedure as for Example IV is used in Example V.

We have found the citrus bio-flavonoid complex to be particularly beneficial in certain conditions often associated with capillary fragility such as hemorrhagic syndromes due to low pro-thrombin blood levels. In such conditions the conjoint use of vitamin K, also known as Menadione, is of value in reducing the bleeding time. This type of product has been found to be beneficial in treating, pre- and post-operatively, children who have undergone tonsillectomies.

Two specific examples of compositions comprising citrus bio-flavonoid complex and vitamin K are given in the following Examples VI and VII.

Example VI

| | Grams |
|---|---|
| (1) Citrus bio-flavonoid complex | 20 |
| (2) Propylene glycol | 466 |
| (3) Ascorbic acid | 22 |
| (4) Sorbitol | 458 |
| (5) Menadione (vitamin K) | 0.133 |
| (6) Saccharine | 5 |
| (7) Water | 221 |

*Procedure.*—(A) Dissolve (5) in 50 grams (2) at 85° C. (B) Dissolve (1) by slow addition to balance of (2) under stirring and add (A). (C) Dissolve (3), (4), (6) in (7). (D) Add (C) to (B) and stir until homogeneous.

Example VII

| | Grams |
|---|---|
| (1) Citrus bio-flavonoid complex | 20 |
| (2) Propylene glycol | 466 |
| (3) Ascorbic acid | 22 |
| (4) Sorbitol | 458 |
| (5) Menadione bisulfite | 0.266 |
| (6) Saccharine | 5 |
| (7) Water | 221 |

*Procedure.*—(A) Dissolve (1) by slow addition to (2) under stirring. (B) Dissolve (3), (4), (5), (6) in (7). (C) Add (B) to (A) and stir until homogeneous.

As in Examples II and III, the compositions having the formulae described in Examples IV to VII, inclusive, are administered in teaspoon doses of 5 cc., supplying 100 mgms. of citrus bio-flavonoid complex. In addition the composition of the formulae of Examples VI and VII, supplies, per teaspoon dose, approximately 0.6 mgm. vitamin K and vitamin K equivalent respectively.

Having described our invention, what we claim is:

1. A composition useful for therapeutic administration, comprising a stable solution of citrus bio-flavonoid complex in propylene glycol, and water, the amount of water being sufficient to give a limpid solution but being limited to a precentage below that which would cause hydrolysis of the bio-flavonoid complex in the solution.

2. A composition comprising the composition of claim 1 and also containing an edible, water-soluble substance increasing the specific gravity of the solution.

3. The composition of claim 2, in which the said water-soluble substance is one of the group consisting of sorbitol and glycerine.

4. The composition of claim 3, in which the said water-soluble substance is present in an amount approximately equal (weight:weight ratio) to the content of propylene glycol.

5. The composition of claim 4, in which the propylene glycol constitutes about thirty-five percent (35%) (by weight) of the solution and in which the water is present in an amount within the range of fifteen percent (15%) and thirty-five percent (35%) by weight of the solution.

6. A composition comprising the composition of claim 4 and also containing an edible, water-soluble substance improving the flavor of the solution, said water-soluble substance being one of the group consisting of sucrose and saccharine.

7. A composition comprising the composition of claim 6 and also containing ascorbic acid.

8. A composition comprising the composition of claim 7 and also containing one of the group consisting of menadione and menadione bisulfate.

References Cited in the file of this patent

UNITED STATES PATENTS 2,543,674  Swayne _____ Feb. 27, 1951

OTHER REFERENCES

Clark: Jour. of Allergy, vol. 21, 1950, pp. 136–137, RC 583 J6.

Jour. of the Am. Pharm. Asso., vol. XXVIII, No. 7, July 1939, pp. 420–421.

Jour. of the Am. Pharm. Asso., Pract. Pharmacy Ed., August 1948, p. 456.

Drug and Cos. Ind., vol. 60, No. 2, February 1947, p. 174.

Federation Proceeding, vol. 9, No. 1, March 1950, pp. 291–292.